United States Patent [19]
Koves

[11] Patent Number: 5,160,513
[45] Date of Patent: Nov. 3, 1992

[54] INLET STREAM DEBRIS COLLECTION METHOD AND APPARATUS

[75] Inventor: William J. Koves, Hoffman Estates, Ill.

[73] Assignee: UOP, Des Plaines, Ill.

[21] Appl. No.: 790,910

[22] Filed: Nov. 13, 1991

[51] Int. Cl.⁵ .............................................. B01D 53/04
[52] U.S. Cl. .............................................. 55/74; 55/98; 55/320; 55/185; 55/387; 55/429; 55/443; 55/474
[58] Field of Search ....................... 55/74, 98, 185, 262, 55/316, 318, 320, 387, 394, 395, 396, 418, 424, 512, 398, 428, 429, 443; 422/195, 217, 220

[56] References Cited

U.S. PATENT DOCUMENTS

| | | | |
|---|---|---|---|
| 3,100,141 | 8/1963 | Donovan | 55/320 X |
| 3,269,097 | 8/1966 | German | 55/429 X |
| 3,431,084 | 3/1969 | Forbes | 422/217 X |
| 3,479,146 | 11/1969 | Hochman et al. | 55/418 X |
| 3,736,728 | 6/1973 | Kleissler | 55/429 X |
| 4,334,897 | 6/1982 | Brady et al. | 55/440 X |
| 4,874,409 | 10/1989 | Vitovec et al. | 55/320 X |

Primary Examiner—Charles Hart
Attorney, Agent, or Firm—Thomas K. McBride; John G. Tolomei

[57] ABSTRACT

An inlet distributor for use in downflow reactors or contacting vessels removes debris from the feedstream that could otherwise plug the top of the catalyst or particle bed surface. Gaseous streams are charged into the inlet distributor and debris is separated from the inlet stream and accumulated in the bottom of the distributor. Fluid flow in the bottom of the distributor is minimized to prevent reentrainment of debris into the gas stream as it leaves the distributor.

11 Claims, 2 Drawing Sheets

INLET STREAM DEBRIS COLLECTION METHOD AND APPARATUS

BACKGROUND OF THE INVENTION

This invention relates generally to the field of fluid-solid contacting. More specifically, this invention deals with the delivery of fluids to beds of particulate material.

Fluid-solid contacting devices have a wide variety of applications. Such devices find common application in processes for hydrocarbon conversion and adsorption columns for separation of fluid components. When the fluid-solid contacting device is an adsorption column, the particulate material will comprise an adsorbent through which the fluid passes. In the case of hydrocarbon conversion, the fluid-solid contacting apparatus is typically a reactor containing catalyst. Typical hydrocarbon conversion reactions that may be carried out are hydrogenation, hydrotreating, hydrocracking, and hydrodealkylation.

Fluid-solid contacting devices to which this invention apply are arranged as an elongated cylinder usually having a vertical orientation through which an essentially vertical flow of fluid is maintained. Particulate material contained in this vessel is arranged in one or more beds. Fluid enters the vessel through an inlet located at an upstream end of the vessel. It is also commonly known to add or withdraw fluid from between the particulate beds. This is commonly done in adsorption schemes where the composition of the fluid passing between particle beds is changing or in hydrocarbon conversion processes where a quench system is used to cool fluid as it passes between beds.

Many of the feeds to such processing units may contain debris. Such debris can consist of small solid particulate material flowing in liquid or gas streams, or discrete droplets of heavy viscous material flowing in either liquid or gas streams. Feeds containing such material are usually referred to as dirty and include single phase or multiphase streams. Such feed components may be part of the feed itself or may be the result of corrosion or deterioration of upstream processing equipment. Typically, the concentration of such material in any feedstream is not high, but over time it can disrupt the operation of the fluid contacting bed. Particulate material can accumulate over the top of the bed surface thereby raising the pressure drop through the bed, or heavy viscous debris can form gummy surfaces that will eventually plug the top surface of the bed.

A common design approach for treating dirty feeds is to provide debris catchers along the surface of the particulate bed. These debris catchers are typically in the form of extended cylinders or baskets that have an open top and extend into the bed anywhere from 1 to 2 or more feet. The gas stream to be contacted flows past the top surface of the bed into the top of the basket and radially outward through perforated sides of the basket. A substantial portion of the debris that enters the basket accumulates on the bottom of the basket.

While the basket design will prevent plugging of the top surface of the bed by debris, they do pose a number of drawbacks. First the presence of the basket affects the flow distribution through the bed. The baskets can cause a substantial portion of the flow through the processing vessel to bypass the upper surface of the bed. In addition, flow through the bed can disrupt the flow of fluid for several feet below the baskets. In addition, the baskets complicate loading of catalyst into the beds since they must be placed into the bed during the particle loading procedure.

SUMMARY OF THE INVENTION

Therefore, it is an object of this invention to provide a method and apparatus for treating dirty feedstreams that does not interfere with the utilization of the bed.

It is a further object of this invention to simplify the method and apparatus for treating dirty feeds.

These and other objects are satisfied by the device of this invention which is a method and apparatus for removing debris from dirty feedstreams before the debris contacts the particulate bed. This invention uses a single distributor to redirect a feedstream that enters a contacting vessel in a radial manner while at the same time removing liquid or solid debris from the feedstream. The debris is eliminated by downwardly discharging the feedstream into a distributor and directing the feed toward a baffle through which the particles pass. The distributor redeflects the fluid streams radially out of the distributor and into contact with the particle bed. The baffle arrangement in the bottom of the distributor collects debris and eliminates turbulence in the collection zone so that the debris is not reentrained with the fluid leaving the distributor. This invention has the advantage of removing debris before it can interfere with the bed surface. In addition, debris can be removed from the inlet distributor without disturbing the bed surface.

Accordingly in one embodiment, this invention is a method of contacting a gas stream containing solid or liquid debris with a bed of particulate material in a downflow reactor. In this process, a fluid stream passes into the inlet of a contacting vessel and enters a fluid distributor. The fluid stream is discharged downwardly into the distributor and directed toward a fluid deflector baffle located above the bottom of the distributor. The fluid stream impacts against the deflector baffle and the debris is collected in the bottom of the distributor below the baffle. The fluid stream having a reduced concentration of debris is discharged from the distributor through perforations located in the sides of the distributor above the baffle. From the distributor the fluid stream passes into contact with the bed of material and the fluid stream is withdrawn from the bed of particulate material and from the contacting vessel.

In another embodiment, this invention is an apparatus for radially distributing and removing debris from a fluid stream. The apparatus includes a distributor vessel having sidewalls that define a perforated portion for permitting fluid flow out of the vessel. A conduit communicates the interior of the distributor vessel with a fluid stream and the conduit is positioned to direct the fluid stream downwardly into the distributor vessel. The distributor vessel has a baffle located below the perforated portion of the sidewalls. A collection space located below the baffle and defined by a lower portion, with respect to fluid flow through the distributor vessel, receives the particles and has a bottom and sidewalls that will prevent passage of the particles out of the bottom of the distributor.

In a yet further embodiment, this invention is an apparatus for radially distributing and removing solid debris from a gas stream. The apparatus comprises a cylinder having a perforated portion defined by the sidewalls of the cylinder. A conduit extends downwardly from the top of the cylinder and communicates with the interior of the cylinder. A grating extends across the transverse cross-section of the cylinder and above the bottom of the cylinder. The grating comprises a plurality of parallel vanes inclined with respect to the vertical axis of the cylinder. At the bottom of the cylinder a debris collection zone is collected. The debris collection zone is defined by the sidewalls and bottom of the cylinder located below the perforated portion of the cylinder.

Additional objects, embodiments, aspects and details of this invention are set forth in the following detailed description.

DETAILED DESCRIPTION OF THE INVENTION

The distributor of this invention can be used in conjunction with any type of particle bed. Typically, the particle bed and inlet distributor will be located inside a vessel for a catalytic reaction or an adsorption process. This invention finds greatest advantage when used with a vessel having a downward flow of fluid from an inlet nozzle through an unconfined bed of particles. The invention can also be used with confined particle beds. In confined particle beds, large scale shifting of the upstream bed surface is not a concern due to restraint by a screen or other confining device but plugging of the bed surface can still cause excessive pressure drop and poor utilization of the particle bed.

Figure 1:
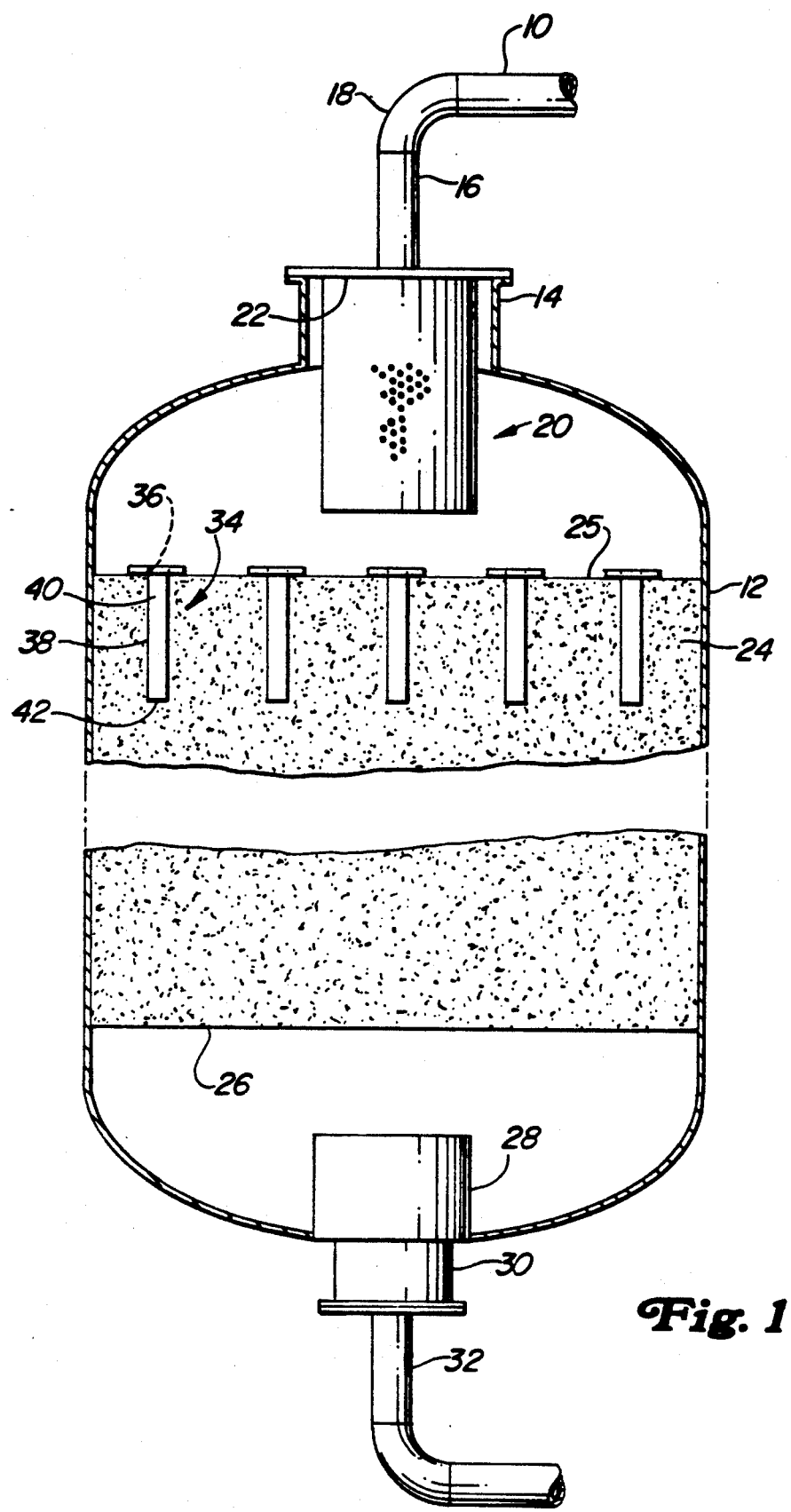
FIG. 1 shows a cross-section of a downflow reactor having an inlet distributor, a particle bed and baskets for debris removal.

This invention is more fully explained in the context of a typical downflow vessel arrangement as shown in FIG. 1. Fluid entering the distributor of this invention may be gaseous phase, liquid phase, or a combination of the two. Greatest advantage is obtained when the fluid stream entering through the inlet distributors is in gas phase. The remainder of this description refers to the fluid as a gas. This reference is not meant to limit the invention to gas phase flow.

Referring again to FIG. 1, an upper pipe 10 delivers a gas phase fluid to a vessel 12 through an inlet nozzle 14 which is connected to pipe 10 through a straight conduit 16 and an elbow 18. All of the gas flow that enters vessel 12 is intercepted first by distributor 20. Distributor 20 has an inlet plate 22 flanged to the top of inlet nozzle 14. Plate 22 secures distributor 20 to vessel 12 and provides a seal between nozzle 14 and inlet plate 22 that prevents fluid from entering vessel 12 without first passing through distributor 20. Other well-known means of attaching distributor 20 to vessel 12 can be used. Nevertheless, whatever method of attachment is used, it is important that the method prevent bypassing of fluid around distributor 20 and into the vessel 12.

Distributor 20 disperses the gas over the cross-section of vessel 12. The dispersed gas enters a particle bed 24 having an upper surface 25. Bed 24 is composed of solid particles which can be in the form of pills, spheres, cylinders, or other extruded shapes. The actual properties of the particles will depend upon the process which is carried out in the containment vessel. Generally, particles will consist of an adsorbent or a catalyst. As a further means of preventing bed disturbances, a layer of support material, usually comprising ceramic balls, may be added and comprise the upper surface of the particle bed. Bed surface 25 will in most cases simply consist of particles that have been leveled at the time of loading. As gas passes across upper surface 25, it proceeds down through the remainder of bed 24. If the top surface of the bed remains level and open, a complete redistribution of the gas is usually effected such that it will pass uniformly through the remainder of the bed. Therefore, it is not essential that distributor 20 provide a completely uniform distribution of gas across the bed surface 25. In the past, the distributor 20 was to provide a fluid, or in this case gas dispersion, that has enough uniformity to eliminate any concentrated jets of fluid having sufficient velocity to disrupt surface 25. After a predetermined contact time, gas leaves the catalyst bed 24 by passing through a porous support member 26. Member 26 can be screen or any other rigid layer of porous material having sufficient strength to support the weight and pressure loading of catalyst bed 24. Exiting gases pass through an outlet screen 28 that collects any fine particles that have passed out of a catalyst bed and through support member 26. From screen 28, exiting gases leave the vessel 12 through an outlet nozzle 30 which is connected to a lower pipe 32.

FIG. 1 also shows one of the prior art methods for collecting debris that would gather at the top of a downflow reactor. Debris collectors, or baskets 34, are shown having an opening 36 for admitting gas into the collector and downwardly extended sidewalls 38 for distributing gas from the interior volume 40 of the basket into the adjacent portions of the bed. The bottom of the basket has end closure 42 to prevent bed particles from moving upward into the interior 40 of the basket. With the distributor of this invention, baskets 34 are no longer necessary and would not be present at the top of the bed.

Figure 2:
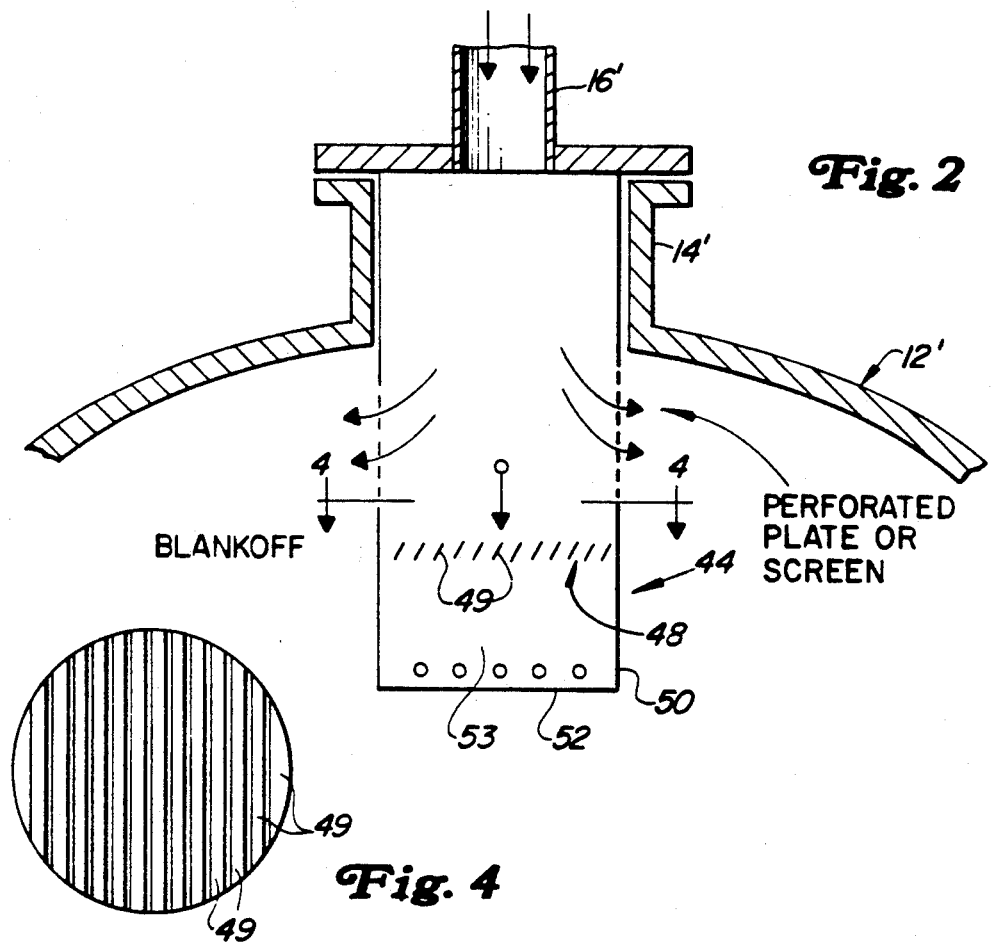
FIG. 2 depicts a cross-section of the top of a reactor vessel and the inlet distributor of this invention.

FIG. 2 illustrates one form of the apparatus and method of this invention. A gas stream containing solid debris enters the top of vessel 12' through a conduit 16'. Conduit 16' directs the gas downwardly into a fluid distributor 44. Fluid distributor 44 has perforated sidewalls 46 that are located between the bottom of the inlet nozzle 14' and a baffle 48 located inside the distributor 44 and arranged in the form of a series of diagonal vanes 49. As gas flows downwardly in the distributor, the momentum of the solid particles carries them through baffle 48 while the lighter gases are diverted radially outward through the sidewall 46. The openings in the perforated portion of the distributor sidewall need not be smaller than the debris that is sought to be trapped within the inlet distributor. The primary mechanism for the removal of the particles in this arrangement is the downwardly directed momentum of the particles which carries the particles out of the gas flow and past the baffle 44.

The sidewall 50 and bottom 52 of the distributor form a collection zone 53 below the baffle 48. The sidewalls 50 and bottom 52 are at least closed to any flow of the solid particles out of the bottom of the distributor and are typically completely closed to fluid flow. When the bottoms and sidewalls 50 and 52 are completely sealed, the volume of the distributor around and below the baffles has no net fluid flow and is essentially dead space. As the particles enter the space below the baffle 48, they come to rest at the bottom of the distributor. Baffles 48 prevent any eddy current from the redirection of the fluid above the baffles from disturbing the particles below the baffle and reentraining them with the outgoing flow of gas from the distributor.

It may be desirable in some cases to have some fluid flow through sidewalls 50 and bottom 52 in the collection zone of the distributor. In such cases, the bottoms and sidewalls can be composed of very fine screen that will not permit solid particles to escape from the collection zone. Such an arrangement may be advantageous where the debris is very fine and some small fluid flow through the collection zone would serve to prevent any migration of fine dust debris back into the space of the distributor above baffle 48. However, such an arrangement is not desired where the debris comprises heavy viscous liquids that may eventually seep through any permeable surface in sidewall 50 or bottom 52. However, any fluid flow that passes through the distributor below the baffle 48 must be kept low in order to achieve the objectives of this invention.

Figure 3:
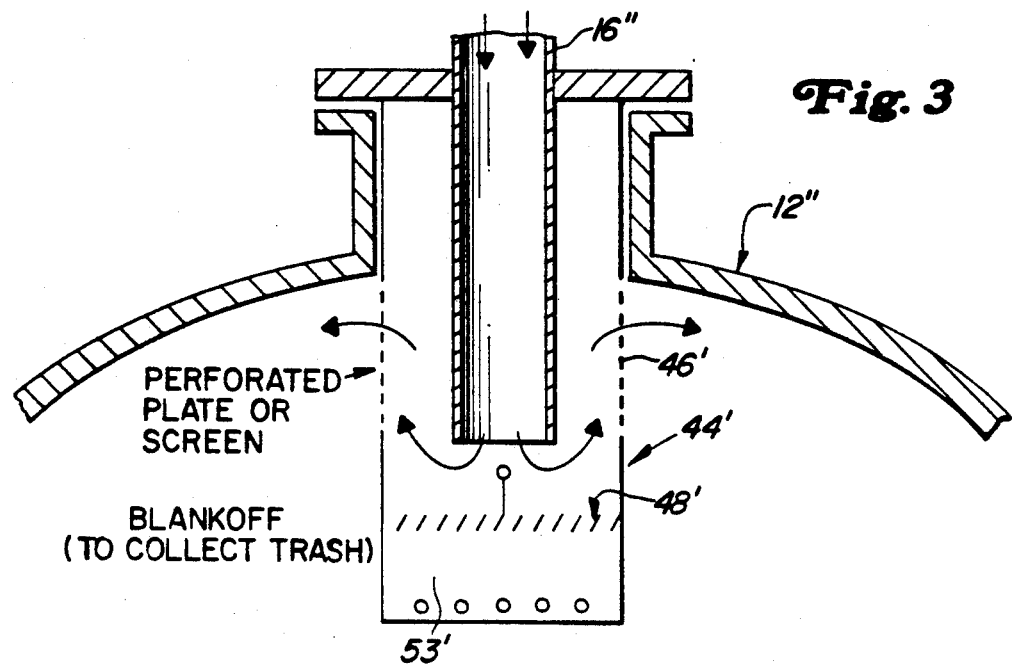
FIG. 3 is a cross-section showing a different form of the inlet distributor of FIG. 2.

The directing of particles into the collection zone of the distributor may be further improved by the arrangement of the invention shown in FIG. 3. In this arrangement gases enter the contacting vessel 12" through a conduit 16". Conduit 16" discharges the particles into an inlet distributor 44' that has a perforated portion 46' of a sidewall through which the gases exit the inlet distributor. Particles and debris collect below baffle 48' in a collection zone 53'. The outlet end of conduit 16" extends downwardly into the inlet distributor past the lower extent of the perforated portion of the sidewall 46'. The extension of conduit 16" prevents the deflection or migration of any of solid particles to the outside of the distributor in the region of the perforated sidewall. In the arrangement of FIG. 3, the flow is thereby confined to direct more of the particles on to the baffles 48'. The arrangement of FIG. 3 is most suitable for lower flow velocities where the gas flow through conduit 16' will not create large cross-currents that could reentrain particles into the gas flow exiting through perforated portion 46'.

Figure 4:
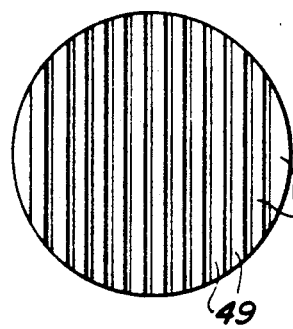
FIG. 4 is a cross-section view of the inlet distributor of FIG. 2 taken along line 4—4.

A variety of different arrangements can be used for the baffle in the bottom of the distributor. The sloped vanes of FIGS. 2 and 3 are shown in FIG. 4 where parallel vanes 49 are spaced transversely across the cross-section of the inlet distributor. The plates 49 are spaced apart and extend in a parallel direction and cover essentially the entire transverse cross-section of the inlet distributor to shield the collection zone from direct gas flow. Those skilled in the art are aware of a variety of suitable plate configurations such as conical or annular plate sections.

I claim:

1. A method of contacting a fluid stream containing solid or liquid debris with a bed of particulate material in a downflow contacting vessel, said process comprising:
   (a) passing said fluid stream into an inlet of a contacting vessel and into a fluid distributor;
   (b) discharging said fluid stream downwardly into said distributor and directing said fluid stream toward a fluid deflector baffle located in and above the bottom of said distributor;
   (c) impacting said fluid stream against said deflector baffle and collecting the debris in the bottom of said distributor below said baffle;
   (d) discharging a fluid stream having a reduced concentration of debris from said distributor through perforations located in the sides of said distributor above said baffle;
   (e) passing said fluid stream having a reduced concentration of debris into contact with a bed of particulate material; and,
   (f) withdrawing the fluid stream from said bed of particulate material and from said contacting vessel.

2. The process of claim 1 wherein the distributor below the baffle is closed to fluid flow out of the distributor.

3. The process of claim 1 wherein said baffle comprises a plurality of vanes located in a horizontal plane.

4. The process of claim 1 wherein said fluid stream enters said distributor through a downwardly extended conduit and is discharged from said conduit into said distributor at a location below said perforations.

5. The process of claim 1 wherein said fluid stream is a gas stream and the debris comprises solid particles.

6. An apparatus for radially distributing and removing debris from a fluid stream, said apparatus comprising:
   (a) a distributor vessel having sidewalls that define a perforated portion for permitting fluid flow out of said vessel;
   (b) a conduit communicating with the interior of said distributor vessel and positioned to direct said fluid stream downwardly into said distributor vessel;
   (c) a baffle located in said distributor vessel below the perforated portion of said sidewalls; and,
   (d) a collection space located below said baffle and defined by a lower portion of said distributor vessel, said bottom portion of said distributor having a bottom and sidewalls that will prevent passage of said particles out of said bottom of said distributor.

7. The apparatus of claim 6 wherein said conduit extends downwardly in said distributor past the said perforated portion of said sidewalls;

8. The apparatus of claim 6 wherein said baffle comprises a transverse grating of slanted plates that extends across said distributor vessel.

9. The apparatus of claim 6 wherein the sidewalls and bottom of said distributor below said baffle are closed to gas flow.

10. An apparatus for radially distributing and removing solid debris from a gas stream, said apparatus comprising:
    (a) a cylinder;
    (b) a perforated portion defined by the sidewalls of said cylinder;
    (c) a conduit extending through the top of said cylinder and communicating with the interior of said cylinder;
    (d) a grating extending across the transverse cross section of said cylinder and above the bottom of said cylinder, said grating comprising a plurality of parallel vanes inclined with respect to the vertical axis of said cylinder; and,
    (e) a debris collection zone defined by the sidewalls and bottom of said cylinder located below said perforated portion.

11. The apparatus of claim 10 wherein said conduit extends below said perforated portion.

* * * * *